United States Patent
Peacock et al.

(10) Patent No.: US 7,984,283 B2
(45) Date of Patent: *Jul. 19, 2011

(54) SYSTEM AND METHOD FOR SECURE OPERATING SYSTEM BOOT

(75) Inventors: Eric Peacock, Sunnyville, CA (US); John J. Youden, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1239 days.

This patent is subject to a terminal disclaimer.

(21) Appl. No.: 11/590,227

(22) Filed: Oct. 31, 2006

(65) Prior Publication Data

US 2008/0104381 A1    May 1, 2008

Related U.S. Application Data

(60) Provisional application No. 60/802,114, filed on May 22, 2006.

(51) Int. Cl.
  *G06F 9/24*    (2006.01)
  *G06F 9/00*    (2006.01)
  *G06F 15/177*  (2006.01)
  *G06F 7/04*    (2006.01)
  *G08B 29/00*   (2006.01)

(52) U.S. Cl. .................. 713/2; 713/1; 713/100; 726/2; 726/34

(58) Field of Classification Search .................. 713/1, 2, 713/100; 726/2, 34
See application file for complete search history.

(56) References Cited

U.S. PATENT DOCUMENTS

| | | | |
|---|---|---|---|
| 5,809,230 A * | 9/1998 | Pereira | 726/35 |
| 5,884,026 A * | 3/1999 | Kong | 726/19 |
| 5,892,906 A | 4/1999 | Chou et al. | |
| 6,415,382 B1 * | 7/2002 | Kwan | 713/2 |
| 2002/0166059 A1 * | 11/2002 | Rickey et al. | 713/200 |
| 2002/0166072 A1 * | 11/2002 | Cromer et al. | 713/202 |
| 2004/0250178 A1 | 12/2004 | Munguia et al. | |
| 2005/0144498 A1 | 6/2005 | Lin | |
| 2005/0193182 A1 * | 9/2005 | Anderson et al. | 711/163 |
| 2006/0105739 A1 | 5/2006 | Frank et al. | |
| 2006/0143446 A1 * | 6/2006 | Frank et al. | 713/164 |
| 2006/0294298 A1 * | 12/2006 | Peterson et al. | 711/112 |
| 2007/0234073 A1 * | 10/2007 | Cromer et al. | 713/193 |
| 2008/0077986 A1 * | 3/2008 | Rivera et al. | 726/20 |

OTHER PUBLICATIONS

Mexican Pat. App. No. 07/13590, Office Action No. 33299, May 14, 2010.
U.S. Appl. No. 11/590,228, Non-Final Office Action mailed Mar. 22, 2010.
U.S. Appl. No. 11/590,228, Non-Final Office Action mailed Sep. 24, 2010.
U.S. Appl. No. 11/590,228, Non-Final Office Action mailed Mar. 14, 2011.

* cited by examiner

*Primary Examiner* — Ji H Bae

(57) ABSTRACT

There is provided a method for operating a basic input/output system (BIOS) of a pay-as-you go computer system. In one example embodiment, the method includes determining if a user password feature is activated on a hard drive and computing a password to unlock the hard drive if the password feature is activated. In another example embodiment, the method includes performing a checksum verification of boot information. In yet another example embodiment, the method includes storing portions of boot information in non-standard locations on the hard drive and combining the portions using operators.

31 Claims, 6 Drawing Sheets

SYSTEM AND METHOD FOR SECURE OPERATING SYSTEM BOOT

CROSS REFERENCE TO RELATED APPLICATIONS

This application is a Non-Provisional Application filed under priority of U.S. Provisional Application No. 60/802,114, entitled "A Method of Controlling Computer System Operation", filed May 22, 2006, which is incorporated herein by reference. Additionally, this application is being filed concurrently with U.S. application Ser. No. 11/590,228, the disclosure of which is incorporated herein by reference.

BACKGROUND

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

To most people, a computer system is an expensive purchase. This is especially true in developing countries. To reduce the initial cost of the ownership, a "pay-as-you-go" business model has been developed. In the "pay-as-you-go" business model, computer systems are initially sold at a considerable discount. It is anticipated that by selling computer usage time for such computer systems, the cost of providing the computer at the discounted price can be recouped over time.

The pay-as-you-go model is vulnerable, however, to the computer system being hacked in such a way that payment is no longer required for usage. Without safeguards, a user may simply replace the operating system and then use the computer without paying. Additionally, because the computer system is initially sold at a discount, purchasers may try to sell the computer system hardware, such as the hard drive and monitor for example, as component parts in hopes of making a profit over the initial cost of the computer system. One solution requires the use of a cryptographic chip, such as a trusted platform module (TPM). Such a solution, however, is not a zero cost solution, as it incurs cost through the design and manufacture of motherboards and cannot share inventory with current retail models.

BRIEF DESCRIPTION OF THE DRAWINGS

Certain exemplary embodiments are described in the following detailed descriptions and in reference to the drawings, in which.

DETAILED DESCRIPTION OF SPECIFIC EMBODIMENTS

Figure 1:
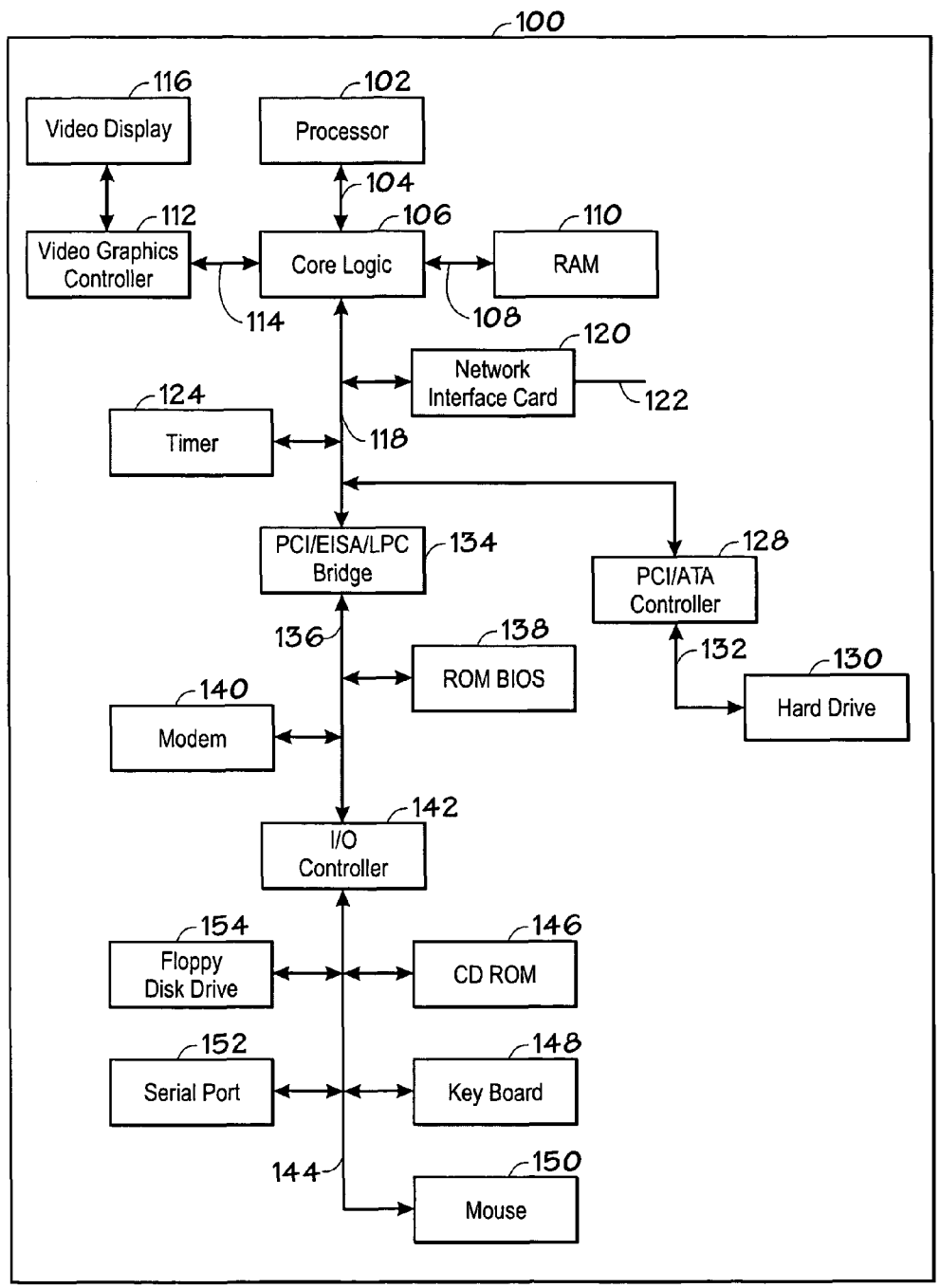
FIG. 1 illustrates a block diagram of a computer system according to an exemplary embodiment of the present invention.

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Techniques to secure the booting of an operating system on the "pay-as-you-go" computer system without the need to develop and implement new and/or additional hardware are herein disclosed. Specifically, there is provided zero cost system and methods for deterring the replacement of metering software in a pay-as-you-go computer system and also to deter the disassembly of the pay-as-you-go computer system to sell the component parts.

The proper operation of the metering software installed on pay-as-you-go computer systems allows for use of the computer system only after usage time has been purchased and, thus, allows for the pay-as-you-go business model to be viable. In order to deter modifying the software or hardware in a manner that renders the metering software ineffective, the BIOS may be designed in a variety of ways. For example, as will be discussed in greater detail below, the BIOS may be designed to load initial boot information from a non-standard location on the hard drive. Also, the boot information may be split into two or more portions and stored in separate sectors on the hard drive, the BIOS combining the two portions to obtain the correct boot information. Additionally, the two or more portions of boot information may be modified in an obscuring manner, such that only by using various types of operators to combine the portions can the boot information be obtained. Additionally, the BIOS may be designed to verify that the hard drive contains the correct boot information. For example, the BIOS may be configured to perform a message digest algorithm 5 (MD5) hash or cyclic redundancy check (CRC)/checksum on a portion or all of the initial boot information and to obtain a first check value compare it to a known MD5 hash or CRC/checksum check value. Also, the BIOS may be designed to allow booting from only a password-protected hard drive. Additionally, the BIOS may be designed to start a timer which is periodically reset by an operating system having the metering software. Further, the BIOS may be designed to compare a time count stored on a motherboard with a time count saved on the hard drive. Each of these BIOS features may be used alone or in any combination to ensure that the pay-as-you-go computer system cannot be modified or split up without rendering it unusable.

Turning to FIG. 1, a computer system is illustrated in accordance with an exemplary embodiment of the present invention and generally designated by the reference number 100. The computer system 100 includes a processor 102 which may include one or more central processing units (CPUs). The processor 102 may be coupled via a bus 104 with a core logic chipset 106. The core logic chipset 106 may manage a variety of functions on behalf of the processor 102.

The core logic chipset 106 may be connected via memory bus 108 to a random access memory (RAM) 110, which may be static random access memory (SRAM), dynamic random access memory (DRAM), or other suitable memory. The RAM 110 may be a shared system memory to hold resident memory files or other information. During operation of the computer system 100, an operating system may be loaded into RAM 110 for execution by the computer system 100. In accordance with this exemplary embodiment, the operating system executed by processor 102 is an operating system configured to meter use in accordance with the "pay-as-you-go" business model. One such example is the Microsoft Windows® XP operating system that has been modified to include metering software. A video graphics controller 112 may also be connected to the core logic chip set 106 via a video bus 114 to provide a signal that produces a display image on a video display 116.

A bus 118, such as a peripheral component interconnect (PCI) bus or the like, may connect the core logic chipset 106 to a variety of system devices such as a network interface card 120. The network interface card 120 may provide communication capability to the computer system 100 via a communication bus 122. The communication bus 122, which may be a physical and/or wireless connection, may be connected to other computer systems. Additionally, a timer/time count 124 may be connected to the bus 118. As will be discussed in greater detail below, the timer/time count 124 may be implemented in order to detect when a non-metering operating system has been booted onto the computer system 100, or when the hard drive 130 has been replaced. The function of timer/time count may be performed by software interacting with the computer's standard clock circuitry.

A PCI/ATA controller 128 may provide access to additional devices, such as a hard drive 130. The hard drive 130 may be connected to the PCI/ATA controller 128 via an ATA bus 132. A PCI/EIFA/LPC bridge 134 may provide access to system devices such as a read-only memory (ROM) 138, a modem 140, or the like via a bus 136. The ROM 138 or another nonvolatile memory such as flash memory stores the basic input/output system (BIOS). The BIOS loads the operating system configured to meter use in accordance with the pay-as-you-go business model. An input/output controller 142, which may be connected to the bus 136, provides access to system devices such as a CD ROM 146, a keyboard 148, a mouse 150, a serial port 152, and a floppy disk drive 154 via a bus 144.

Figure 2:
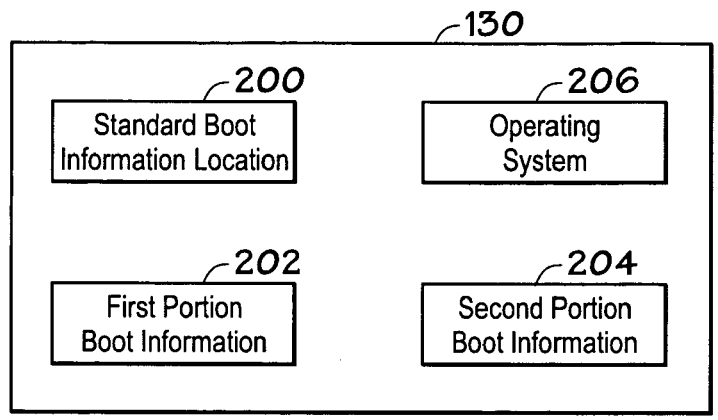
FIG. 2 illustrates a block diagram of the hard drive of the computer system of FIG. 1. according to an exemplary embodiment of the present invention.

In a conventional computer system, the BIOS loads boot information from a standard location of the hard drive 130, which is the first physical sector of the hard drive and is commonly referred to as the master boot record (MBR). In contrast, the BIOS of computer system 100 may be designed to load boot information from a non-standard location in accordance with an exemplary embodiment of the present invention. The boot information may include the number of partitions, the size of a primary partition, the type of the primary partition and the disk signature. FIG. 2 illustrates the hard drive 130 wherein a standard boot information location 200 does not contain boot information. The standard boot information location 200 may simply be full of zeroes or, alternatively, may contain decoy boot information. The placing of decoy boot information in the standard boot information location 200 may deceive a potential hacker into believing that a standard boot information location 200 holds the valid boot information, when in reality it does not. Modifying the BIOS to load boot information from one or more different sectors may prevent the loading a standard operating system image or any other standard software utility.

To prevent a potential hacker from simply scanning the hard drive 130 to discover the location of the boot information, the boot information may be split into two or more portions and stored in separate sectors on the hard drive 130. For example, as illustrated in FIG. 2, a first portion of boot information is stored at a first location 202, while a second portion of boot information is stored at a second location 204. Either or both of the two portions may be in a non-standard location on the hard drive. Additionally, two or more portions of boot information may be modified in an obscuring manner, such that only by using various types of operators, such as AND, OR, NOT, or XOR, to combine the portions can the boot information be obtained. For example, the first portion could be a copy of the boot information with all of the even-numbered bits set to zero and the second portion could be a copy of the boot information with all of the odd numbered bits set to zero, such that the boot information can be obtained by performing a bytewise logical OR operation on the two portions. FIG. 2 also illustrates that the operating system 206 is stored on the hard drive 130. The operating system 206 is a metering operating system. It may track the amount of usage of the computer system 100, and it allows the computer system 100 to be used only if the user has paid for the usage time. For example, the user may purchase a card from a vendor having an amount of usage time associated with an account number corresponding to that particular card. A user may enter the account number into the computer system 100 to use the computer system 100.

Figure 3:
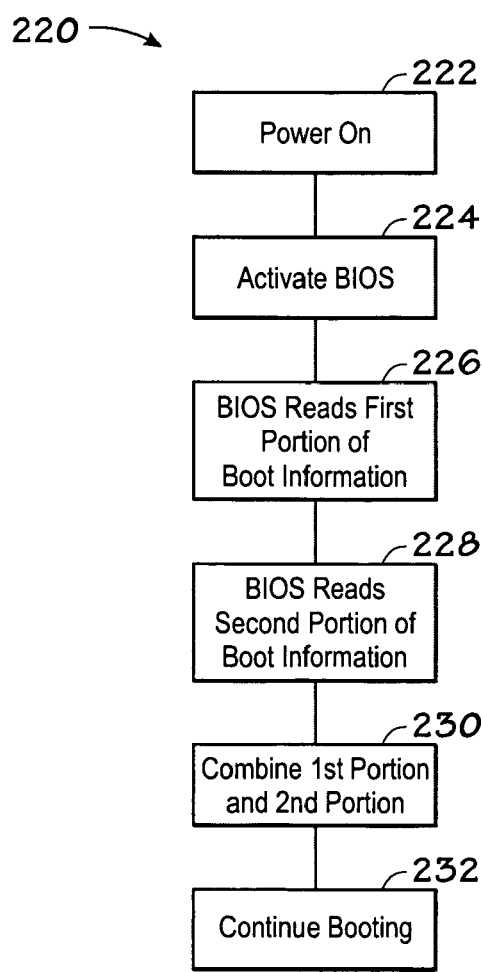
FIG. 3 illustrates a flow chart of BIOS operation in accordance with an exemplary embodiment of the present invention, wherein the BIOS reads boot information from a nonstandard location on the exemplary hard drive of FIG. 2.

In one exemplary embodiment, the boot information is simply stored in a non-standard location, and the BIOS designed to load from the non-standard location. A flowchart 220 illustrating another exemplary technique of the BIOS designed to read boot information from two hard drive locations is illustrated in FIG. 3. Either or both of the locations may be non-standard. Initially, the computer system 100 is powered on (block 222) and the BIOS is activated (block 224). The modified BIOS reads a first portion of boot information from the non-standard location on the hard drive (block 226). The BIOS then reads a second portion of the boot information from a second location (block 228) and combines the first portion and the second portion using one or more suitable types of operators (block 230). After the boot information has been obtained, the BIOS continues booting according to the obtained boot information (block 232).

In accordance with an alternative exemplary embodiment of the present invention, the BIOS 138 may be designed to allow booting only from a password-protected hard drive. Password protection for hard drives is an optional feature defined in the ATA/ATAPI-7 V1 specification and is a firmware option for hard drive vendors. It is typically used by the BIOS to prevent access to the hard drive until a user enters a password during booting. However, in accordance with the alternative embodiment of the present invention, instead of a user entering a password, the BIOS supplies a calculated password. The details of password calculation will be described below, but briefly explained, the ATA specification allows for a 32 byte password which is calculated by concatenating a constant 24 character globally unique identifier (GUID) with an eight character cyclic redundancy check (CRC). The CRC is calculated based on several parameters stored in the BIOS, including the computer system's 100 serial number. Thus, the password is unique per system and cannot simply be discovered and leaked over the Internet. Additional protection may be obtained by changing the GUID for each new motherboard.

The hard drive 130 remains locked when booting the computer system 100 from other devices, such as floppy disk drive or CD ROM. This prevents a user from installing a fresh copy of an operating system from a bootable CD ROM, for example. Additionally, the resale value of the hard drive 130 is effectively zero since it is password protected and the data cannot be accessed on another system. Furthermore, the motherboard cannot be used to boot another hard drive because it requires a hard drive protected with the correct password.

Figure 4:
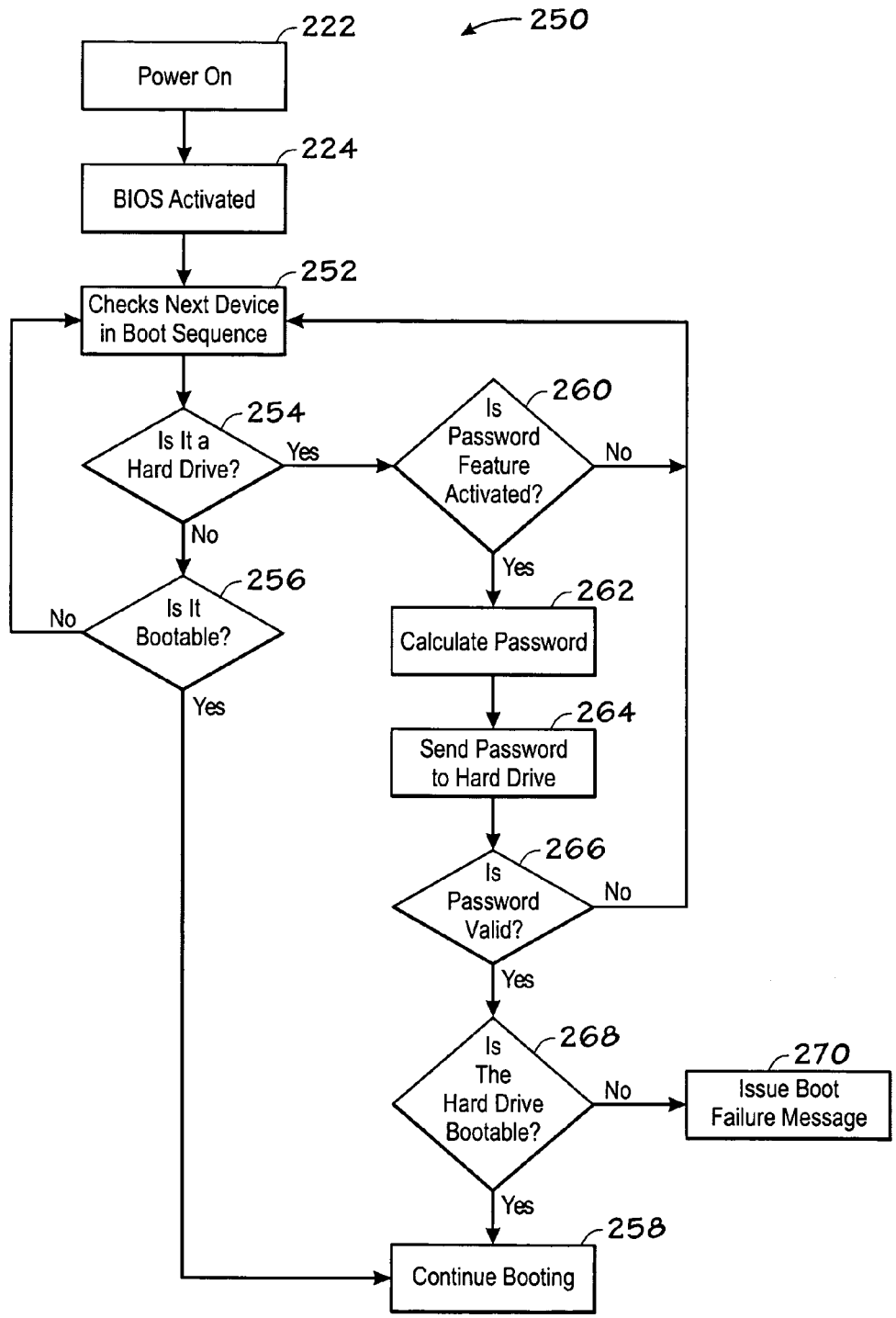
FIG. 4 illustrates a flow chart for BIOS operation in accordance with an exemplary embodiment of the invention, wherein the BIOS only loads boot information from a properly password protected hard drive, such as the hard drive of FIG. 2.

A flowchart 250 is illustrated in FIG. 4 demonstrating the operation of such a BIOS with the password protected hard drive, in accordance with an exemplary embodiment of the invention. Initially, the computer system 100 is powered on (block 222) and the BIOS activated (224). The BIOS checks for boot devices in accordance with the boot sequence (block 252), typically following a boot sequence that checks the floppy disk drive 154, the CD ROM 146 and then the hard drive 130. The BIOS determines whether each device in the boot sequence is hard drive 130 (block 254). If the device is not the hard drive 130, the BIOS determines whether the device is bootable (block 256). If it is not bootable, the BIOS checks for the next device in the boot sequence (block 252). If, however, the device is bootable, the BIOS will continue booting (block 258) from that device.

If the device is determined to be the hard drive 130, the BIOS determines if the password feature is activated (block 260). If the password feature is not activated, the BIOS checks for the next device in the boot sequence (block 252). If, however, the password feature is activated, the BIOS calculates the password for the hard drive 130 (block 262), the password is sent to the hard drive 130 (block 264) and checked for validity (block 266). If the password is invalid, the BIOS does not boot from the hard drive 130 and checks for the next device in the boot sequence (block 252). Alternatively, if the password is valid, the BIOS determines whether the hard drive 130 is bootable (block 268). If the hard drive 130 is determined to be unbootable, a boot-failure message is issued (block 270). If however it is determined that the hard drive 130 is bootable, the BIOS continues booting using the hard drive 130 (block 258). If no bootable, password-protected hard drive is ultimately found, a boot-failure message may be issued.

The password generation is relatively quick and easy to calculate since the BIOS recalculates and supplies the password to the hard drive 130 every time power is cycled on the hard drive 130, for example during a power on or reset of the computer system 100. As mentioned above, the ATA specification allows for a 32 byte password in words 1-16 of the SECURITY UNLOCK COMMAND. The password may be obtained by taking SMBIOS 2.4 fields in order and calculating the 32 bit CRC value. Specifically, take the Type 1 serial number, Type 1 SKU Number, and Type 1 Family Number, and calculate the 32 bit CRC value expressed as eight hexadecimal uppercase ASCII characters. The remaining 24 characters of the password may be set to a fixed 24 character string. This 24 character string could be changed in the future for different motherboards implementing different BIOSes as an additional security measure in case the CRC algorithm were ever compromised.

The 32 bit CRC uses the industry standard CRC32 polynomial which is 0x04C11DB7 with a starting value of 0xFFFFFFFF. Many examples of how to implement CRC32 in assembly language can be found in the art. There are two common methods. In the first method, the new CRC is calculated after each byte is input using a combination of shifts and XORs. This method is convenient for assembly language coding since it is convenient to supply input a byte at a time. The code is very compact and reasonably fast. In a second method, the new CRC is calculated after each byte is input using table lookup. This second method is faster but uses more memory than the first method. The table may be calculated at run time and stored in RAM, or alternatively it may be stored in ROM or other nonvolatile memory.

The password protected hard drive 130 provides a certain level of protection, however, yet another alternative exemplary embodiment may be implemented to deter other types of attacks. For example, once the computer system 100 has booted from the hard drive 130 and the password has been supplied to the hard drive 130, if a hacker manages to install a new version of the operating system that does not have metering software, then the pay-as-you-go software could be circumvented. To prevent such an occurrence, the BIOS may be modified to verify that the hard drive 130 contains the correct boot information. For example, the BIOS may be configured to perform a message digest algorithm 5 (MD5) hash or CRC/checksum from on part or all of the boot information to obtain a first check value and compare it to a known MD5 hash or CRC/checksum check value stored with the BIOS. Only if the check values match is the system allowed to boot.

Currently, several computer manufacturers use a custom master boot record (MBR). During manufacture, a MD5 hash or CRC/checksum of the custom MBR may be taken and stored with the BIOS. The MBR is the first piece of code the BIOS loads and executes from the hard drive 130 when booting the computer system 100. The MBR contains boot information such as the number, type and size of the primary partition and a disk signature. During installation of an operating system, the MBR is replaced to be compatible with the new operating system. In accordance with the present technique, the modified BIOS implementing the MD5 hash or CRC/checksum protects against any change in the hard disk partition structure, disk signature, initial boot code or bootable partition, as new operating system installs most likely will change one or more of the above parameters.

Figure 5:
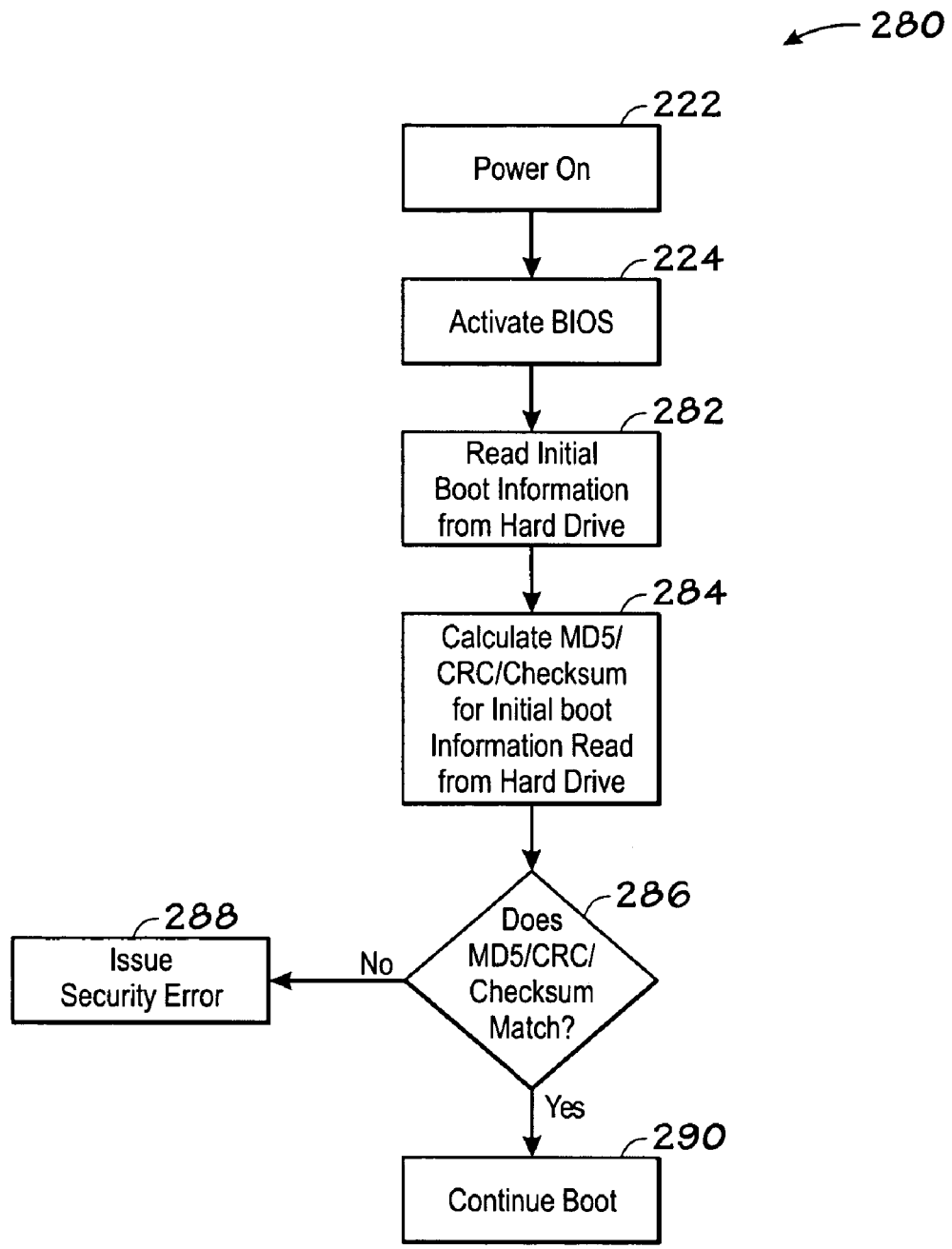
FIG. 5 illustrates the operation of the BIOS in accordance with an exemplary embodiment of the invention in using an MD5 hash or CRC/checksum to validate a hard drive, such as the hard drive of FIG. 2.

Turning to FIG. 5, a flow chart 280 illustrating the use of a MD5 hash or CRC/checksum to validate the initial boot information is illustrated, in accordance with an exemplary embodiment of the invention. The computer system 100 is powered on (block 222) and the BIOS is activated (block 224). The BIOS reads initial boot information from the hard drive 130 (block 282) and calculates the MD5 hash or CRC/checksum from the initial boot information read from the hard drive 130 (block 284). The BIOS then determines whether the MD5 hash or CRC/checksum matches with a known good value stored with the BIOS (block 286). If the MD5 hash or CRC/checksums do not match, a security error is issued (block 288). Alternatively, if they do match, the BIOS continues to boot using the initial boot information (block 290).

Figure 6:
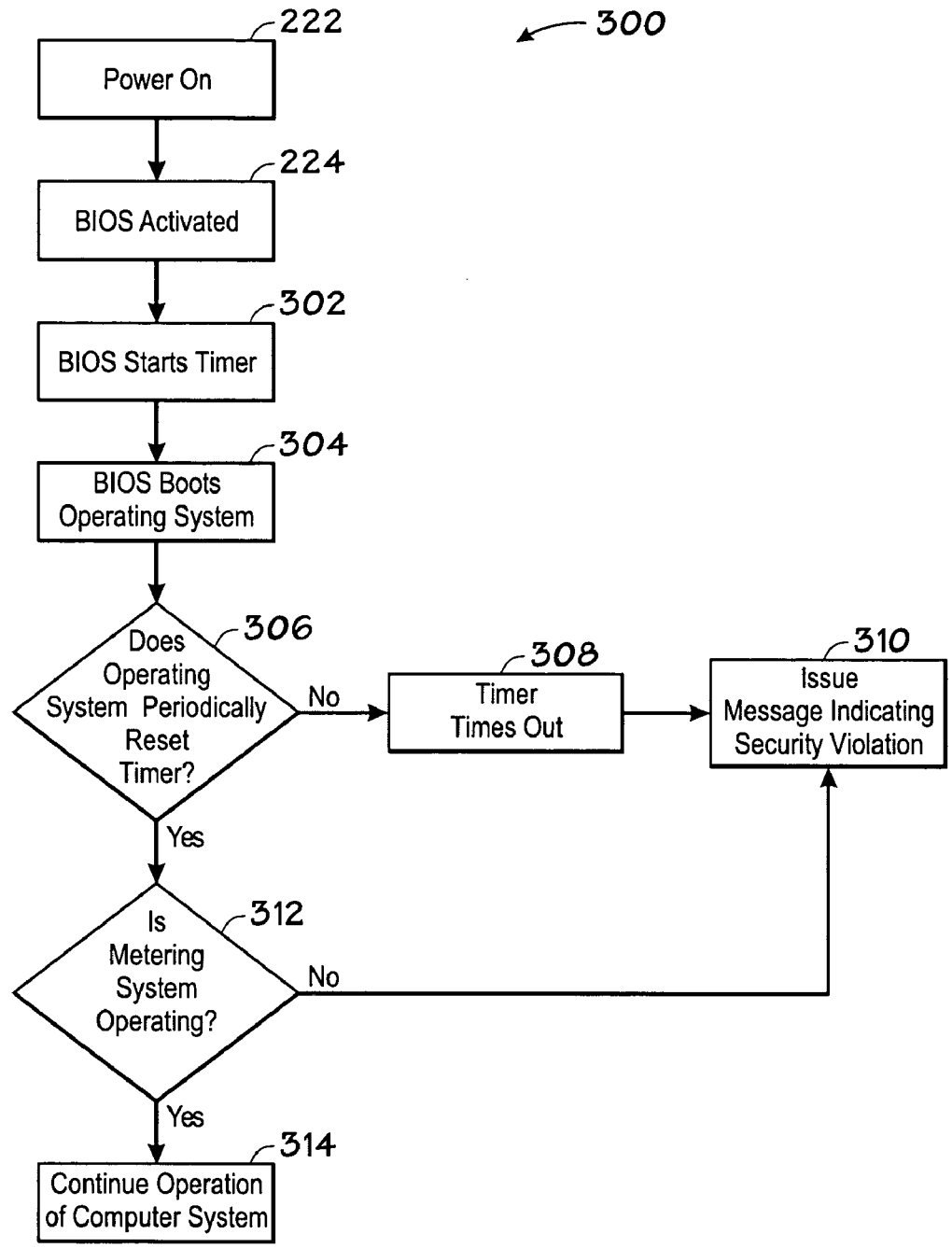
FIG. 6 is a flow chart illustrating operation of a computer system in accordance with an exemplary embodiment of the invention, wherein the BIOS starts a watchdog timer.

In yet another alternative embodiment, the BIOS may be designed to start a watchdog timer, such as timer 124, configured to be periodically reset by the metering software of the pay-as-you-go operating system. Additionally, the operating system component for resetting the watchdog timer may include a software check to determine the integrity of the metering system. If the watchdog timer 124 is allowed to expire, the computer system 100 displays a message indicating that a security violation has occurred. FIG. 6 illustrates a flow chart 300 depicting this technique, in accordance with an exemplary embodiment of the invention. Initially, the computer system 100 is powered on (block 222) and the BIOS is activated (block 224). The BIOS starts the watchdog timer 124 (block 302) and loads the operating system (block 304). If the operating system fails to reset the watchdog timer 124 (block 306), the watchdog timer 124 times out (block 308) and issues a message indicating a security violation (block 310). If, however, the operating system resets the timer (block 306), the BIOS then determines whether the metering system is operable within the operating system (block 312). If the metering system is not operating, a message is issued indicating the security violation (block 310). Alternatively, if it is determined that the metering system is operating, the computer system 100 may continue to operate (block 314).

Thus, the use of the watchdog timer 124 protects against substitution of the pay-as-you-go operating system with a version which does not reset the watchdog timer 124. Additionally, monitoring the integrity of the metering system protects the watchdog reset portion of the operating system from being transplanted into a version of the operating system which does not include the "pay-as-you-go" metering component.

In yet another alternative exemplary embodiment, the BIOS may be modified to compare two or more timers. Specifically, a time count stored on a motherboard of the computer system 100 representing the use time of the motherboard may be compared with a time count stored on the hard drive 130 representing the use time of the hard drive. In accordance with this exemplary embodiment, the timer/time count 124 may represent the time count stored on the motherboard and may be updated by the pay-as-you-go metering software of the operating system. The time count stored on the hard drive 130 may be stored in the self-monitoring and reporting (SMART) data and may be updated by the hard drive firmware.

If comparison of the time counts demonstrates a substantial difference, such as a difference greater than a threshold amount, a security violation is detected and a security violation message is issued. Differences resulting from timer drift may be compensated for by synchronizing the hard drive 130 time count with the time count on stored at the timer 124 on the motherboard at each instance additional use time is purchased. Accordingly, one possibility for determination of the threshold may depend on the incremental size of use time that may be purchased. For example, if use time may be purchased in increments of 40, 80 and 120 hours, the threshold may be set to approximately 120 hours to preclude the possibility of a false detection of a security violation. Because the time count on the mother board is only synchronized with the time count on the hard drive by the addition of use time, the installation of an operating system that does not have the appropriate metering system may be detected. For example, if the computer system 100 is no longer running the correct "pay-as-you-go" software, then the timer 124 time count does not get updated and the time count of the hard drive 130 does. The two time counts quickly become very different, and a security violation may be detected.

Normally, when a hacker attempts to hack a system, they obtain immediate feedback whether the hack worked. Implementation of the dual timers allows for a lag time between the time that a hacker actually hacks the system and the time that the security violation is detected and indicated, making it more difficult for a hacker to discover what caused the security breach. Using the timer techniques disclosed herein, it may appear initially that a hack worked only for the system to fail later.

Figure 7:
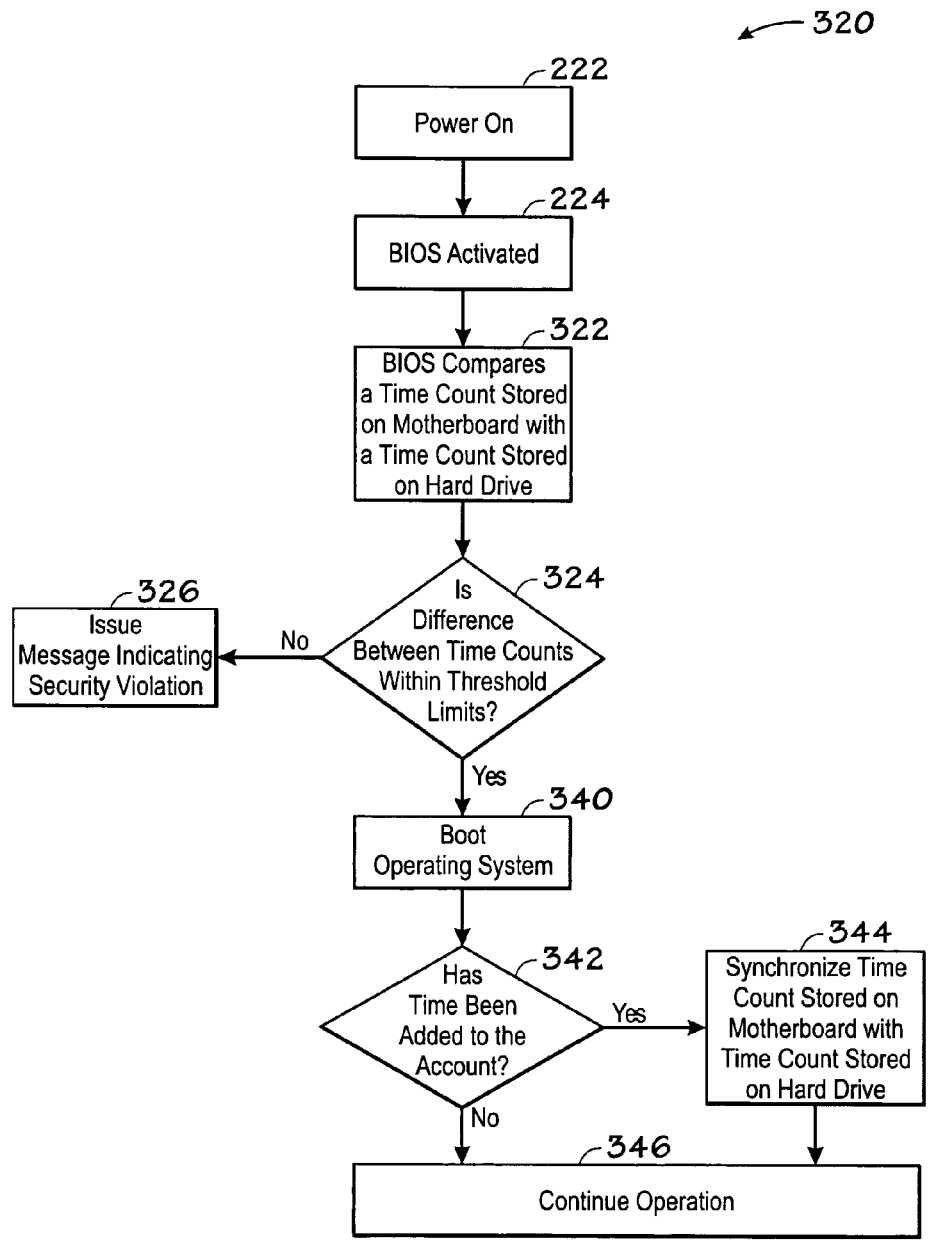
FIG. 7 is a flow chart illustrating operation of a computer system in accordance with an exemplary embodiment of the invention, wherein the BIOS compares a time count stored on the motherboard with a time count stored on a hard drive, such as the hard drive of FIG. 2.

Turning to FIG. 7, a flow chart 320 illustrating the dual timer technique, in accordance with an exemplary embodiment of the invention, is shown. Initially the computer system 100 is powered on (block 222) and the BIOS is activated (block 224). The BIOS compares a time count stored on the motherboard with the time count stored on the hard drive 130 (block 322). The BIOS then determines whether the difference between the time counts is within threshold limits (block 324). If the difference between the time counts is outside the threshold limits, a message indicating security violation is issued (block 326).

If the difference between the time counts is within threshold limits, the operating system is booted (block 340). Once the operating system is booted it determines whether time has been added to the account (block 342). If time has been added to the account, the time count stored on the motherboard is synchronized with the time count stored on the hard drive (block 344) and the computer continues operation (block 346).

As mentioned above, one or more of the particular embodiments disclosed herein may be used in combination with other exemplary embodiments herein disclosed. The exemplary embodiments provide a reasonable level of security and deterrent effect without incurring cost. Specifically, the exemplary embodiments are able to be implemented on a standard motherboard and chassis. Additionally, by not using a standard boot procedure, the methods prevents use of standard tools, such as DOS tools, and is therefore resistant to being hacked by use of those tools.

The invention claimed is:

1. A method for operating a basic input/output system (BIOS) of a pay-as-you-go computer system comprising:
   activating a BIOS to boot the pay-as-you-go computer;
   reading a first portion of boot information from a first location on a hard drive;
   reading a second portion of boot information from a second location on the hard drive, wherein both the first location and the second location are not the standard boot sector of the hard drive;
   combining the first and second portions of boot information; and
   continuing to boot the computer system using the boot information obtained by combining the first and second portions of boot information.

2. The method of claim 1, wherein a decoy copy of boot information is stored in the standard boot sector of the hard drive of the computer system.

3. The method of claim 1, wherein combining the first and second portions further comprises using an operator.

4. The method of claim 3, wherein the operator comprises at least one logical operator.

5. The method of claim 1, wherein the second portion of boot information is stored non-contiguously with the first portion of boot information.

6. The method of claim 1, further comprising verifying that the hard drive contains the correct boot information.

7. The method of claim 6, wherein verifying that the hard drive contains the correct boot information further comprises:

performing one of a check sum, a message-digest algorithm 5 (MD5), and a cyclic redundancy check (CRC) on the boot information obtained by combining the first and second portions of boot information to obtain a first check value;
comparing the first check value with a second check value stored with the BIOS; and
issuing a security error if the first and second check values do not match.

8. The method of claim 1 comprising:
determining if a user password feature is activated on the hard drive;
if the user password feature is activated, then calculating a password;
sending the password to the hard drive;
unlocking the hard drive if the password is valid;
determining if the hard drive is bootable;
issuing a boot failure message if the hard drive is not bootable; and
continuing booting if the hard drive is bootable.

9. The method of claim 1 comprising:
starting a timer, the timer being configured to issue a security violation message if the timer is not periodically reset; and
booting an operating system, the operating system being configured to:
periodically reset the timer, the operating system verifying if a metering system for the pay-as-you-go computer system is operating; and
issuing a security violation message if it is determined that the metering system is not operating.

10. The method of claim 1 comprising:
comparing a first time count stored on a motherboard of the computer system with a second time count stored on the hard drive;
locking the computer system if a difference between the first and second time counts is greater than a threshold amount; and
synchronizing the second time count with the first time count when additional time is purchased for the pay-as-you-go computer system.

11. A method for operating a basic input/output system (BIOS) of a pay-as-you-go computer system comprising:
activating a BIOS to boot the pay-as-you-go computer;
reading a first portion of boot information from a first location on a hard drive;
reading a second portion of boot information from a second location on the hard drive;
combining the first and second portions of boot information, wherein combining the first and second portions further comprises using an operator; and
continuing to boot the computer system using the boot information obtained by combining the first and second portions of boot information.

12. The method of claim 11, wherein both the first location and the second location are not the standard boot sector of the hard drive.

13. The method of claim 12, wherein a decoy copy of boot information is stored in the standard boot sector of the hard drive of the computer system.

14. The method of claim 11, wherein the operator comprises at least one logical operator.

15. The method of claim 11, wherein the second portion of boot information is stored non-contiguously with the first portion of boot information.

16. The method of claim 11, further comprising verifying that the hard drive contains the correct boot information.

17. The method of claim 16, wherein verifying that the hard drive contains the correct boot information further comprises:
performing one of a check sum, a message-digest algorithm 5 (MD5), and a cyclic redundancy check (CRC) on the boot information obtained by combining the first and second portions of boot information to obtain a first check value;
comparing the first check value with a second check value stored with the BIOS; and
issuing a security error if the first and second check values do not match.

18. The method of claim 11 comprising:
determining if a user password feature is activated on the hard drive;
if the user password feature is activated, then calculating a password;
sending the password to the hard drive;
unlocking the hard drive if the password is valid;
determining if the hard drive is bootable;
issuing a boot failure message if the hard drive is not bootable; and
continuing booting if the hard drive is bootable.

19. The method of claim 11 comprising:
starting a timer, the timer being configured to issue a security violation message if the timer is not periodically reset; and
booting an operating system, the operating system being configured to:
periodically reset the timer, the operating system verifying if a metering system for the pay-as-you-go computer system is operating; and
issuing a security violation message if it is determined that the metering system is not operating.

20. The method of claim 11 comprising:
comparing a first time count stored on a motherboard of the computer system with a second time count stored on the hard drive;
locking the computer system if a difference between the first and second time counts is greater than a threshold amount; and
synchronizing the second time count with the first time count when additional time is purchased for the pay-as-you-go computer system.

21. A pay-as-you-go computer comprising:
a memory configured to store a basic input/output system (BIOS) of the pay-as-you-go computer; and
a processor configured to activate the BIOS to boot the pay-as-you-go computer, wherein the BIOS is configured to:
read a first portion of boot information from a first location on a hard drive of the pay-as-you-go computer;
read a second portion of boot information from a second location on the hard drive, wherein both the first location and the second location are not the standard boot sector of the hard drive;
combine the first and second portions of boot information; and
continue to boot the pay-as-you-go computer using the boot information obtained by combining the first and second portions of boot information.

22. The pay-as-you-go computer of claim 21, wherein the hard drive comprises a standard boot sector configured to store a decoy copy of boot information.

23. The pay-as-you-go computer of claim 21, wherein the BIOS is configured to verify that the hard drive contains the correct boot information by:

performing one of a check sum, a message-digest algorithm 5 (MD5), and a cyclic redundancy check (CRC) on the boot information obtained by combining the first and second portions of boot information to obtain a first check value;

comparing the first check value with a second check value stored with the BIOS; and issuing a security error if the first and second check values do not match.

24. The pay-as-you-go computer of claim 21, wherein the BIOS is configured to:

determine if a user password feature is activated on the hard drive;

if the user password feature is activated, then calculate a password;

send the password to the hard drive;

unlock the hard drive if the password is valid;

determine if the hard drive is bootable;

issue a boot failure message if the hard drive is not bootable; and continue booting if the hard drive is bootable.

25. The pay-as-you-go computer of claim 21, wherein the BIOS is configured to:

start a timer, the timer being configured to issue a security violation message if the timer is not periodically reset; and boot an operating system, the operating system being configured to:

periodically reset the timer, the operating system verifying if a metering system for the pay-as-you-go computer is operating; and issue a security violation message if it is determined that the metering system is not operating.

26. The pay-as-you-go computer of claim 21, wherein the BIOS is configured to:

compare a first time count stored on a motherboard of the pay-as-you-go computer with a second time count stored on the hard drive;

lock the computer if a difference between the first and second time counts is greater than a threshold amount; and synchronize the second time count with the first time count when additional time is purchased for the pay-as-you-go computer.

27. A pay-as-you-go computer comprising:

a memory configured to store a basic input/output system (BIOS) of the pay-as-you-go computer; and a processor configured to activate the BIOS to boot the pay-as-you-go computer, wherein the BIOS is configured to:

read a first portion of boot information from a first location on a hard drive of the pay-as-you-go computer;

read a second portion of boot information from a second location on the hard drive, combine the first and second portions of boot information using an operator; and continue to boot the computer system using the boot information obtained by combining the first and second portions of boot information.

28. The pay-as-you-go computer of claim 27, wherein the BIOS is configured to verify that the hard drive contains the correct boot information by:

performing one of a check sum, a message-digest algorithm 5 (MD5), and a cyclic redundancy check (CRC) on the boot information obtained by combining the first and second portions of boot information to obtain a first check value;

comparing the first check value with a second check value stored with the BIOS; and issuing a security error if the first and second check values do not match.

29. The pay-as-you-go computer of claim 27, wherein the BIOS is configured to:

determine if a user password feature is activated on the hard drive;

if the user password feature is activated, then calculate a password;

send the password to the hard drive;

unlock the hard drive if the password is valid;

determine if the hard drive is bootable;

issue a boot failure message if the hard drive is not bootable; and continue booting if the hard drive is bootable.

30. The pay-as-you-go computer of claim 27, wherein the BIOS is configured to:

start a timer, the timer being configured to issue a security violation message if the timer is not periodically reset; and boot an operating system, the operating system being configured to:

periodically reset the timer, the operating system verifying if a metering system for the pay-as-you-go computer is operating; and issue a security violation message if it is determined that the metering system is not operating.

31. The pay-as-you-go computer of claim 27, wherein the BIOS is configured to:

compare a first time count stored on a motherboard of the pay-as-you-go computer with a second time count stored on the hard drive;

lock the computer if a difference between the first and second time counts is greater than a threshold amount; and synchronize the second time count with the first time count when additional time is purchased for the pay-as-you-go computer.

* * * * *